G. A. STEWART & H. E. GOODELL.
TIRE.
APPLICATION FILED JAN. 23, 1912.
1,053,238.
Patented Feb. 18, 1913.
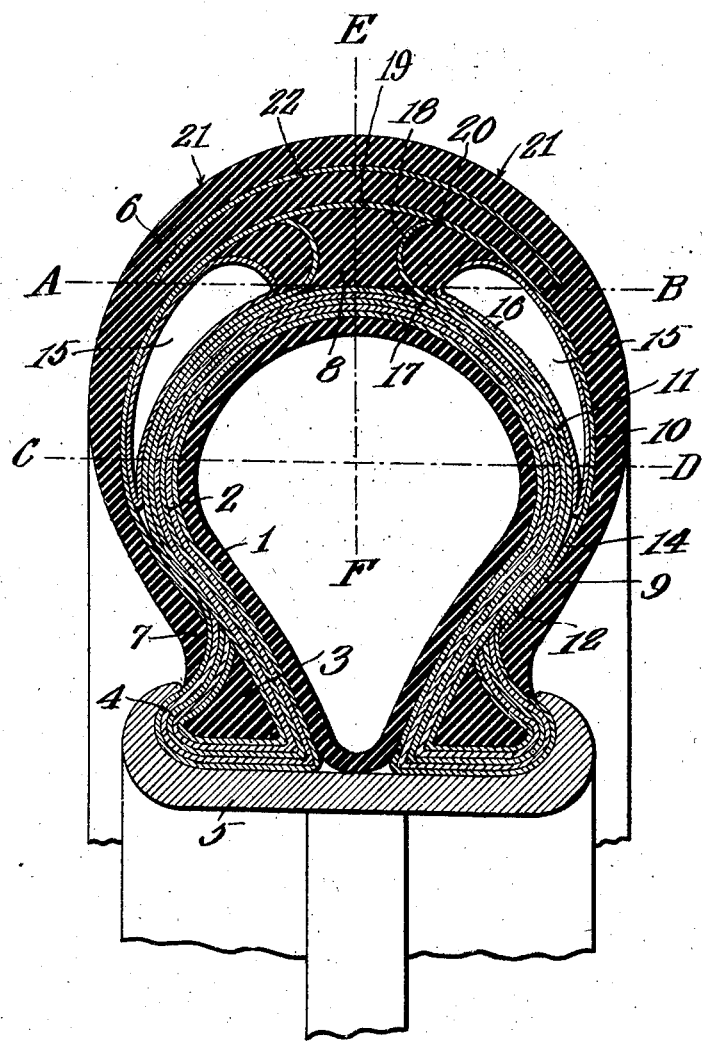
George A. Stewart,
Harlan E. Goodell,
Inventors
Witnesses
by C. A. Snow & Co.
Attorneys

UNITED STATES PATENT OFFICE.

GEORGE A. STEWART AND HARLAN E. GOODELL, OF RIDLEY PARK, PENNSYLVANIA.

TIRE.

1,053,238. Specification of Letters Patent. Patented Feb. 18, 1913.

Application filed January 23, 1912. Serial No. 672,845.

*To all whom it may concern:*

Be it known that we, GEORGE A. STEWART and HARLAN E. GOODELL, citizens of the United States, residing at Ridley Park, in the county of Delaware, State of Pennsylvania, have invented a new and useful Tire, of which the following is a specification.

The present invention aims to provide a tire which will possess the resiliency of the standard pneumatic tire, the improved tire being more durable than the standard tire, and being less liable to puncture.

A further object of the invention is to provide a tire which is reinforced at the tread, and between the auxiliary air chambers, thereby to resist puncture and cutting.

The invention aims further to provide a tire having a comparatively narrow tread rib, whereby the weight will be carried by the main, central air chamber, so that the tire will be permitted to yield at its sides, the auxiliary air chambers permitting such yielding.

A further object of the invention is to provide a tire having auxiliary, side air chambers, permitting the cross sectional area of the inner tube to be reduced.

A further object of the invention is to provide a tire in which an intermediate case is made efficient to define the side air chambers, and further made efficient as a means for reinforcing the tread rib.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

The preferred form of the invention is shown in a single cross-sectional figure.

In carrying out the invention there is provided an inner tube 1, inclosed by an inner case 2, the case 2 ordinarily consisting of five layers of fabric, although the number of layers may be increased or decreased, depending upon the nature of the duty which is imposed upon the tire. The beads 3 may be of any desired form, and about the beads 3, the edges of the inner case 2 are carried, outwardly, as shown at 4, the rim 5 being constructed in any desired manner, so as to interlock properly with the beads 3.

Surrounding the inner case 2 is a tread 6, preferably fashioned from rubber; the tread 6 terminating, as shown at 7, adjacent the rim 5. At the periphery of the tire, the tread 6 is equipped with a tread rib 8, projected toward the axis of the tire, into engagement with the inner case 2.

Located between the tread 6 and the inner case 2 is an intermediate case 9, which is a composite structure. The intermediate case 9 comprises an outer layer 10 and an inner layer 11, these layers being preferably fashioned from fabric. The layers 10 and 11 are in contact, adjacent the rim 5, as shown at 12, the portions 12 of the layers 10 and 11 being held in close and intimate contact between the tread 6 and the inner case 2. At a point approximately opposite to the axis of the tire, the layers 10 and 11 diverge, as shown at 14, to define air spaces 15, located at opposite sides of the central air chamber of the tire. In the auxiliary air chambers 15, tubes 16, preferably although not necessarily fashioned from fabric, may be placed. Between the air chambers 15 and the median plane of the tire, the layer 11 of the intermediate case is in contact with the inner case 2, as shown at 17. The extremities of the inner layers 11 are carried radially, as shown at 18, into the tread rib 8, so as to reinforce the same, the outer layer 10 being carried in a continuous length, circumferentially of the tire, and through the tread rib 8, the layers 11 and 10 contacting, preferably, adjacent the periphery of the tire, as shown at 20.

The tread rib 8, under ordinary circumstances, tends to carry the weight into the inner case 2, the periphery of the tire being thus relieved of strain, upon both sides of the tread 8, at the points at which the reference characters 21 are applied. The auxiliary air chambers 15, therefore, under normal conditions, are relieved of a great portion of the weight of the vehicle.

In present practice, the tires are frequently injured by reason of the fact that obstructions engage the tire adjacent the points 21, the foregoing being notably true, when the tire is traversing a channeled railroad rail or like structure, having parallel flanges which engage the tire upon both sides of the tread rib 8. In a tire as herein disclosed, such a structure will not cut or injure the tire, by reason of the fact that the air chambers 15 are provided, the tread rib 8 carrying the major portion of the weight of the vehicle, and thus leaving the air chambers 15 free to receive the additional strain imposed upon the tire, when the tire is running in a channeled rail, or encounters any other obstacle which indents the tire upon either side of the tread rib 8.

Attention is directed to the fact that the auxiliary chambers 15 extend uninterruptedly across two parallel lines A—B and C—D, both of which are at right angles to the median plane E—F of the tire, the line A—B being tangential to the outer face of the case 2, and the line C—D passing through the inner chamber of the tire. Owing to this disposition of the air chambers 15 with respect to the lines A—B and C—D, and owing to the fact that there are no intermediate supporting ribs in the chambers 15, the chambers extending unbrokenly across the lines A—B and C—D, the chambers will be free to yield when an obstacle of the nature hereinbefore described, is encountered.

The auxiliary chambers 15 receive the major portion of the shock incident to traversing the channeled rail, or encountering a like obstruction, and by reason of this fact, the flexure of the inner case 2 is reduced to a minimum, thereby preventing a separation of the constituent layers of the inner case.

The tread 6 obviously prevents the fabric cases 2 and 9 from being saturated by moisture, and a reinforcing layer of fabric 22, interposed in the tread 6, adjacent the periphery of the tire, serves to reinforce the tread, and to render the device less liable to puncture.

Having thus described the invention, what is claimed is:—

1. A tire comprising an inner case; a tread having a rib engaging the inner case at the periphery of the inner case; and an intermediate case located between the tread and the inner case, the intermediate case consisting of an outer layer and a pair of inner layers, the inner layers diverging from the outer layer, to form auxiliary air chambers at the sides of the tire, the outer layer being extended circumferentially of the tire, through the rib, and the inner layer being carried into the rib radially of the tire, and between the auxiliary air chambers, to reinforce the rib.

2. A tire comprising an inner case; a tread having a rib engaging the inner case at the periphery of the tire; and an intermediate case consisting of inner and outer members, spaced apart in their intermediate portions, to define air chambers at the sides of the tire, the inner and outer layers being engaged in the rib, and having their ends held in close contact, by and between the tread and the inner case.

In testimony that we claim the foregoing as our own, we have hereto affixed our signatures in the presence of two witnesses.

GEORGE A. STEWART.
HARLAN E. GOODELL.

Witnesses:
WM. R. TRAINER,
ELWOOD W. WEBB.